US010549865B2

(12) United States Patent
Kelly

(10) Patent No.: US 10,549,865 B2
(45) Date of Patent: Feb. 4, 2020

(54) LIGHTNING PROTECTED GAS TURBINE ENGINE

(71) Applicant: HONEYWELL INTERNATIONAL INC., Morris Plains, NJ (US)

(72) Inventor: Jeffrey M. Kelly, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 176 days.

(21) Appl. No.: 15/788,362

(22) Filed: Oct. 19, 2017

(65) Prior Publication Data

US 2019/0118967 A1    Apr. 25, 2019

(51) Int. Cl.
| | | |
|---|---|---|
| *B64D 45/02* | (2006.01) | |
| *B64D 27/10* | (2006.01) | |
| *B64D 27/26* | (2006.01) | |
| *F01D 25/24* | (2006.01) | |
| *F01D 25/28* | (2006.01) | |

(52) U.S. Cl.
CPC .............. *B64D 45/02* (2013.01); *B64D 27/10* (2013.01); *B64D 27/26* (2013.01); *F01D 25/24* (2013.01); *F01D 25/28* (2013.01)

(58) Field of Classification Search
CPC ........ B64D 45/02; B64D 27/10; B64D 27/26; F01D 25/28; F01D 25/24; F01D 9/065; F01D 25/162; F05D 2240/60
See application file for complete search history.

(56) References Cited

U.S. PATENT DOCUMENTS 7,377,750 B1 * 5/2008 Costin ................... F03D 80/30
361/220
7,654,790 B2 * 2/2010 Molbech ................ H02G 13/00
415/1
2015/0354460 A1 * 12/2015 Burd ..................... F02C 7/266
60/776
2017/0174359 A1 * 6/2017 Furukawa .............. B64D 29/06
2018/0195407 A1 * 7/2018 Kudrna .................. F01D 25/005
2019/0135449 A1 * 5/2019 Peres ..................... B64D 45/02

FOREIGN PATENT DOCUMENTS

EP        0221202 A1    1/1987

OTHER PUBLICATIONS

Fisher, Franklin A. and J. Anderson Plumer, "Lightning Protection of Aircraft," NASA Reference Publication 1008, https://ntrs.nasa.gov, Apr. 1977.
Kattamis, Alex and Matthew Pooley, "Lightning Protection for Wind Turbines," www.exponent.com, Jun. 2017.
Extended EP Search Report for Application No. 18201079.3 dated Dec. 21, 2018.

* cited by examiner

*Primary Examiner* — Sizo B Vilakazi
(74) *Attorney, Agent, or Firm* — Lorenz & Lopf, LLP

(57) ABSTRACT

A lightning protected gas turbine engine includes an engine mount structure, an engine case, a gas turbine engine, and a conductive rod. The engine mount structure has at least one engine mounting pad thereon, and the engine case is coupled to the engine mount structure. The gas turbine engine is disposed within the engine case and includes at least a rotationally mounted shaft. The conductive rod has a first end and a second end, and extends through the engine case and into the gas turbine engine. The first end of the conductive rod is electrically coupled to the shaft, and the second end of the conductive rod is electrically coupled to the at least one engine mounting pad.

20 Claims, 2 Drawing Sheets

LIGHTNING PROTECTED GAS TURBINE ENGINE

TECHNICAL FIELD

The present invention generally relates to gas turbine engines, and more particularly relates to lightning protected gas turbine engines.

BACKGROUND

Aircraft may traverse through areas of lightning activity. At times, lightning may strike the aircraft, and more particularly the aircraft propulsion engine(s), causing lightning current to traverse the path of least resistance to the rear of the aircraft. Such a path may be, for example, down the propulsion engine shaft. In such instances, the lightning current will likely travel over a bearing, or series of bearings, dependent on the design of the engine. This means the lightning current path is from the bearing inner race, to a point location on a ball bearing, to a point location on the bearing outer race. The small cross-sectional area of these point locations can result in arcing, and potential micro-damage to the ball bearing. Indeed, when a propulsion engine is rebuilt after a lightning strike, pitting in the bearing(s) is typically observed during the rebuild. Moreover, lightning strikes can also disrupt the digital electronic control system of the engine.

Hence, there is a need for a means of protecting gas turbine propulsion engines from lightning strikes that will either bypass the engine bearings or divide the lightning current over multiple bearings, and that will bypass the digital electronic control system of the engine. The present invention addresses one or more of these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a lightning protected gas turbine engine includes an engine mount structure, an engine case, a gas turbine engine, and a conductive rod. The engine mount structure has at least one engine mounting pad thereon, and the engine case is coupled to the engine mount structure. The gas turbine engine is disposed within the engine case and includes at least a rotationally mounted shaft. The conductive rod has a first end and a second end, and extends through the engine case and into the gas turbine engine. The first end of the conductive rod is electrically coupled to the shaft, and the second end of the conductive rod is electrically coupled to the at least one engine mounting pad.

In another embodiment, a lightning protected gas turbine engine includes an engine mount structure, an engine case, a turboprop gas turbine propulsion engine, a conductive rod, and a sleeve. The engine mount structure has at least one engine mounting pad thereon, and the engine case is coupled to the engine mount structure. The turboprop gas turbine propulsion engine is disposed at least partially within the engine case and includes at least a rotationally mounted shaft. The conductive rod has a first end and a second end, and extends through the engine case and into the gas turbine engine. The first end of the conductive rod is electrically coupled to the shaft, and the second end of the conductive rod is electrically coupled to the at least one engine mounting pad. The sleeve surrounds at least a portion of the conductive rod, and at least partially comprises an electrically conductive material.

In yet another embodiment, a lightning protected gas turbine engine includes an engine mount structure, an engine case, a turboprop gas turbine propulsion engine, a conductive rod, a sleeve, and at least one electrical conductor. The engine mount structure has at least one engine mounting pad thereon, and the engine case is coupled to the engine mount structure. The turboprop gas turbine propulsion engine is disposed within the engine case and includes at least a rotationally mounted shaft. The conductive rod has a first end and a second end, and extends through the engine case and into the gas turbine engine. The first end of the conductive rod is electrically coupled to the shaft, the second end of the conductive rod is electrically coupled to the at least one engine mounting pad. The sleeve surrounds at least a portion of the conductive rod, and at least partially comprises an electrically conductive material. The at least one electrical conductor is coupled to the at least one engine mounting pad and to the second end of the conductive rod to thereby electrically couple the conductive rod to the engine mount structure.

Furthermore, other desirable features and characteristics of the lightning protected gas turbine engine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although embodiments of what is claimed are described in the context of a turboprop gas turbine propulsion engine, it will be appreciated that the claimed invention may be applied to numerous types of gas turbine engines, not just propulsion engines, and not just turboprop gas turbine propulsion engines.

Figure 1:
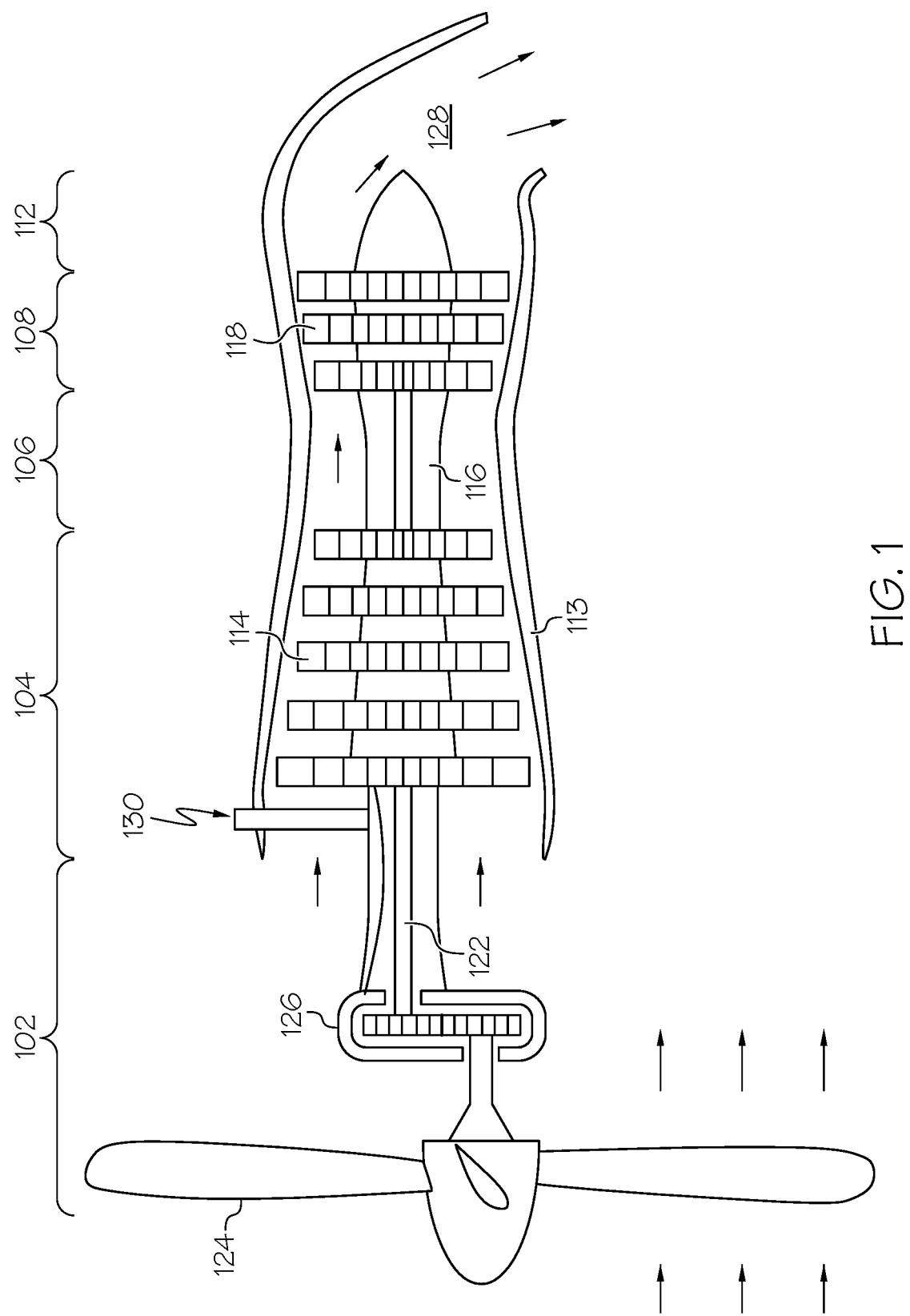
FIG. 1 a simplified cross section view of one embodiment of a turboprop gas turbine propulsion engine.

Referring to FIG. 1, a simplified cross section view of one embodiment of a turboprop gas turbine propulsion engine 100 is depicted. The depicted engine 100 includes an intake section 102, a compressor section 104, a combustion section 106, a turbine section 108, and an exhaust section 112, at least portions of which are disposed within, or defined by, an engine case 113.

During engine operation, air is drawn into the intake section 102 and is directed into the compressor section 104. In the compressor section 104, which includes one or more compressors 114, the air is compressed. The compressed air is then directed into the combustion section 106, which includes a combustor 116. In the combustor 116, fuel is mixed with the compressed air, and the fuel-air mixture is combusted to produce hot combustion gas.

The hot combustion gas is directed into the turbine section 108, which includes one or more turbines 118. The hot combustion gas expands through the turbine 118 causing it to rotate and generate torque. The turbine 118 is coupled, via a rotationally mounted shaft 122, to the compressor 118. Thus, via the shaft 122, a portion of the torque generated by the turbine 118 drives the compressor 114. The shaft 122 is also coupled to, and provides the remaining portion of the generated torque to, a propeller 124. The propeller 124 is preferably coupled to the shaft 122 via reduction gears 126 that convert the high RPM/low torque output of the turbine 118 to low RPM/high torque for the propeller 124.

The gases that exit the turbine 118 are directed to and through a propelling nozzle 128 in the exhaust section 112, and are then exhausted to atmospheric pressure. The propelling nozzle 128 provides additional thrust.

As FIG. 1 also depicts, the illustrated engine 100 preferably includes a lightning protection device 130. The lightning protection device 130 extends through the engine case 113 and provides protection against lightning strikes. A more detailed description of the lightning protection device 130 will now be provided. Before doing so, however, it is noted that, while not depicted in FIG. 1, the engine 100 is preferably coupled, via the engine case 113, to an engine mount structure. Moreover, while also not depicted in FIG. 1, the shaft 122 is rotationally mounted in the engine case 122 via a plurality of bearing assemblies.

Figure 2:
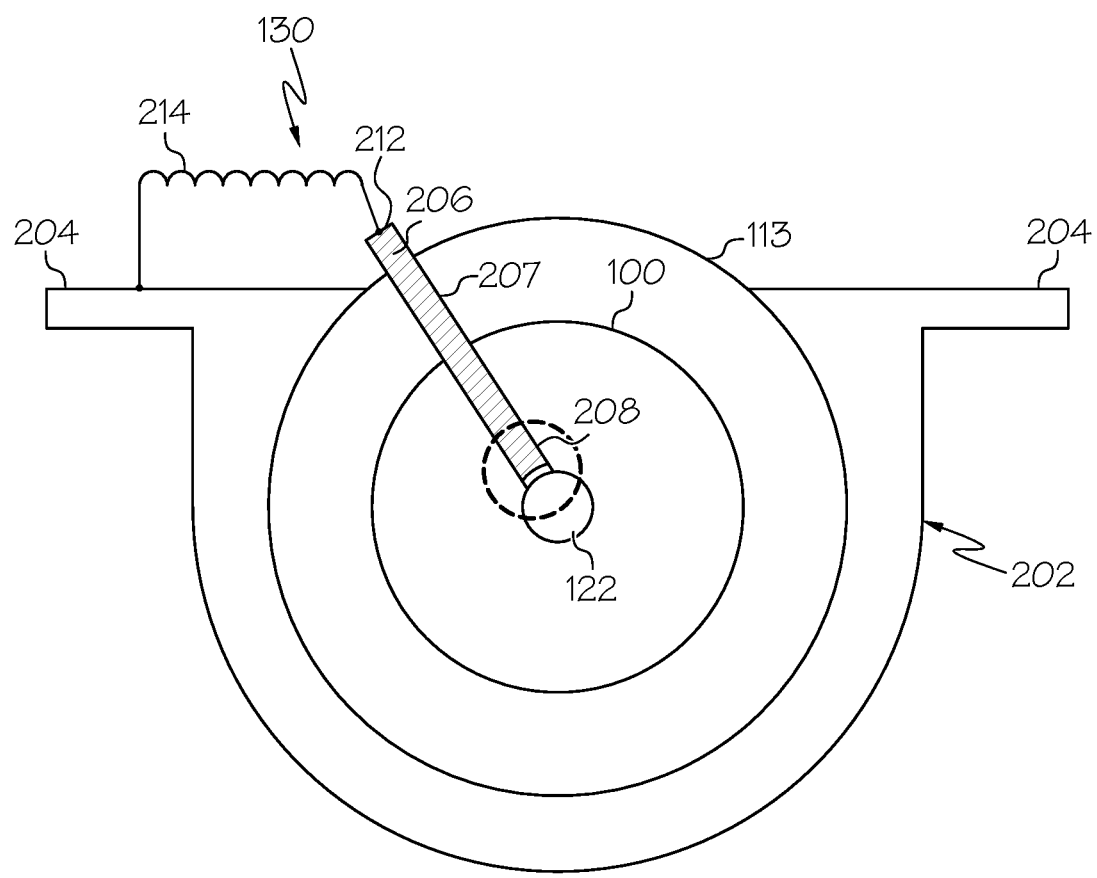
FIG. 2 depicts a simplified cross section end view of a gas turbine engine, such as the one depicted in FIG. 1, mounted in an engine mount structure.

Turning now to FIG. 2, a simplified cross section end view of a gas turbine engine, such as the engine 100 described above, is depicted. The depicted engine 100 is, as noted above, coupled to an engine mount structure 202. The engine mount structure 202 includes at least one engine mounting pad 204. In the depicted embodiment, two engine mounting pads 204 are shown. It will be appreciated that the engine mount structure 202 could, if needed or desired, include more than this number of mounting pads. Regardless of the number, the mounting pads 204, as is generally known, are used to mount the engine 100 to, for example, an aircraft.

The lightning protection device 130 is also depicted in FIG. 2. The lightning protection device 130 extends at least through the engine case 113 and into the engine 100. In some embodiments, the lightning protection device 130 may also extend through the engine mount structure 202. The lightning protection device 130 is implemented using a conductive rod 206 that has a first end 208 and a second end 212.

It will be appreciated that the conductive rod 206 may be variously shaped and configured. For example, the conductive rod 206 may be straight, as shown in FIG. 1, or it may have one or more bends or curves formed therein. The conductive rod 206 may have a cylindrical or any one of numerous non-cylindrical shapes. The conductive rod 206 may have a homogeneous cross-sectional shape throughout its length (e.g., circular cross-section), or it may have differing cross-sectional shapes throughout its length, between the first and second ends 208, 212.

It will additionally be appreciated that the conductive rod 206 may be formed of any one numerous electrically conductive materials. Such materials may include any one of numerous metals, metal alloys, or various non-metallic conductors. Some non-limiting examples include copper, aluminum, gold, silver, tungsten, iron, tin, steel, graphite, and various conductive polymers, just to name a few. In a particular preferred embodiment, the conductive rod 206 comprises copper. Moreover, as FIG. 2 also depicts, the conductive rod 206 may be surrounded, at least partially, by a conductive sleeve 207. The sleeve 207, when included may also be formed of any one of numerous electrically conductive materials. In a particular preferred embodiment, however, the sleeve 207 comprises stainless steel.

Regardless of its shape, configuration, and material make-up, the conductive rod 206 is electrically coupled to the shaft 122 and to at least one of the engine mounting pads 204. More specifically, and at least in the depicted embodiment, the first end 208 of the conductive rod 206 is electrically coupled to the shaft 122, and the second end of the conductive rod 206 is electrically coupled to at least one engine mounting pad 204. The manner in which the conductive rod 206 is electrically coupled to the shaft 122 and the engine mounting pad(s) 204 may vary. In one embodiment, the conductive rod 206 is electrically coupled indirectly to the shaft 122, and in another embodiment, it is electrically coupled directly to the shaft 122.

Figure 3:
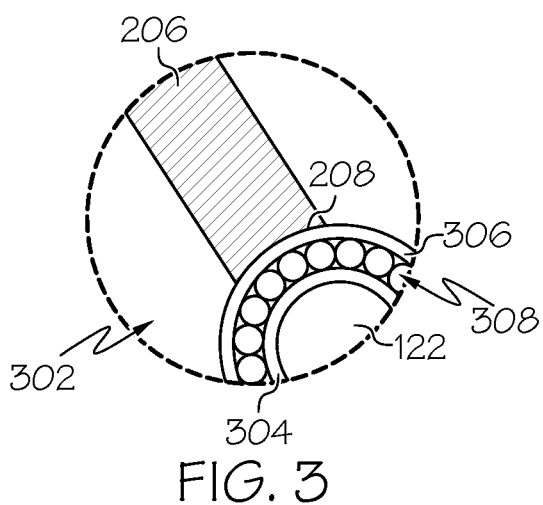
FIGS. 3 and 4 depict close-up views of the portion encircled in phantom in FIG. 2, according to different embodiment.
Figure 4:
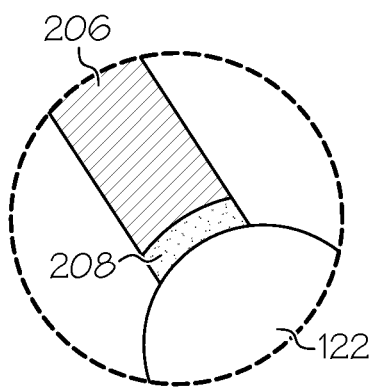

Referring to FIG. 3, which is a close-up view of the portion encircled in phantom in FIG. 2, the embodiment in which the conductive rod 206 is electrically coupled indirectly to the shaft 122 is depicted. As noted previously, the shaft 122 is rotationally mounted in the engine case 122 via a plurality of bearing assemblies 302, one of which is partially depicted in FIG. 3. Although the configuration of the bearing assemblies 302 may vary, the depicted bearing assembly 302 includes an inner race 304, an outer race 306, and a plurality of roller elements 308. The inner race 304 is mounted on the shaft 122, and the roller elements 308 are disposed between the inner and the outer races 304, 306. As FIG. 3 also depicts, the conductive rod 206, and more specifically the first end 208 of the conductive rod 206, physically contacts the outer race 306. Turning now to FIG. 4, which is also a close-up view of the portion encircled in phantom in FIG. 2, the embodiment in which the conductive rod 206 is electrically coupled directly to the shaft 122 is depicted. In this embodiment, the first end 208 of the conductive rod 206 comprises an abrasive material, and the first end 208 physically contacts the shaft 122. It will be appreciated that the abrasive material may vary, but is preferably an electrically conductive abrasive material. Some non-limiting examples of suitable, electrically conductive, abrasive materials include a metallic matrix with copper, silver, gold, aluminum, tin, bronze, or various alloys thereof. The metallic matrix may also have various oxides or carbides embedded therein.

Returning to FIG. 2, it is seen that the depicted lightning protection device 130 additionally includes at least one electrical conductor 214. The electrical conductor 214 is coupled to the at least one engine mounting pad 204 and to the second end 212 of the conductive rod 206, to thereby electrically couple the conductive rod 206 to the engine mount structure 204. In a particular preferred embodiment, the lightning protection device 130 includes a plurality of electrical conductors 214, each of which is coupled to the at least one engine mounting pad 204 and to the second end 212 of the conductive rod 206. Including a plurality of electrical conductors 214 provides redundancy in the unlikely event that one of the electrical conductors 214 were to become inoperable.

The gas turbine propulsion engines described herein are protected from lightning strikes in a manner that will either bypass the engine bearings or divide the lightning current over multiple bearings, and that will bypass the digital electronic control system of the engine.

In one embodiment, a lightning protected gas turbine engine includes an engine mount structure, an engine case, a gas turbine engine, and a conductive rod. The engine mount structure has at least one engine mounting pad thereon, and the engine case is coupled to the engine mount structure. The gas turbine engine is disposed within the engine case and includes at least a rotationally mounted shaft. The conductive rod has a first end and a second end, and extends through the engine case and into the gas turbine engine. The first end of the conductive rod is electrically coupled to the shaft, and the second end of the conductive rod is electrically coupled to the at least one engine mounting pad.

These aspects and other embodiments may include one or more of the following features. The shaft may be rotationally mounted via a plurality of bearing assemblies. Each bearing assembly includes an inner race, an outer race, and a plurality of roller elements disposed between the inner race and the outer race. The inner race may be mounted on the shaft, and the conductive rod may physically contact the outer race. The first end of the conductive rod may comprise an abrasive material, and the first end may physically contact the shaft. An electrical conductor may be coupled to the at least one engine mounting pad and to the second end of the conductive rod to thereby electrically couple the conductive rod to the engine mount structure. A plurality of electrical conductors may each be coupled to the at least one engine mounting pad and to the second end of the conductive rod to thereby electrically couple the conductive rod to the engine mount structure. A sleeve may surround at least a portion of the conductive rod, and at least partially comprise an electrically conductive material. The conductive rod may comprise copper, and the sleeve may comprise stainless steel. The gas turbine engine may be a turboprop gas turbine propulsion engine.

In another embodiment, a lightning protected gas turbine engine includes an engine mount structure, an engine case, a turboprop gas turbine propulsion engine, a conductive rod, and a sleeve. The engine mount structure has at least one engine mounting pad thereon, and the engine case is coupled to the engine mount structure. The turboprop gas turbine propulsion engine is disposed at least partially within the engine case and includes at least a rotationally mounted shaft. The conductive rod has a first end and a second end, and extends through the engine case and into the gas turbine engine. The first end of the conductive rod is electrically coupled to the shaft, and the second end of the conductive rod is electrically coupled to the at least one engine mounting pad. The sleeve surrounds at least a portion of the conductive rod, and at least partially comprises an electrically conductive material.

These aspects and other embodiments may include one or more of the following features. The shaft may be rotationally mounted via a plurality of bearing assemblies. Each bearing assembly includes an inner race, an outer race, and a plurality of roller elements disposed between the inner race and the outer race. The inner race may be mounted on the shaft, and the conductive rod may physically contact the outer race. The first end of the conductive rod may comprise an abrasive material, and the first end may physically contact the shaft. An electrical conductor may be coupled to the at least one engine mounting pad and to the second end of the conductive rod to thereby electrically couple the conductive rod to the engine mount structure. A plurality of electrical conductors may each be coupled to the at least one engine mounting pad and to the second end of the conductive rod to thereby electrically couple the conductive rod to the engine mount structure. The conductive rod may comprise copper, and the sleeve may comprise stainless steel.

In yet another embodiment, a lightning protected gas turbine engine includes an engine mount structure, an engine case, a turboprop gas turbine propulsion engine, a conductive rod, a sleeve, and at least one electrical conductor. The engine mount structure has at least one engine mounting pad thereon, and the engine case is coupled to the engine mount structure. The turboprop gas turbine propulsion engine is disposed within the engine case and includes at least a rotationally mounted shaft. The conductive rod has a first end and a second end, and extends through the engine case and into the gas turbine engine. The first end of the conductive rod is electrically coupled to the shaft, the second end of the conductive rod is electrically coupled to the at least one engine mounting pad. The sleeve surrounds at least a portion of the conductive rod, and at least partially comprises an electrically conductive material. The at least one electrical conductor is coupled to the at least one engine mounting pad and to the second end of the conductive rod to thereby electrically couple the conductive rod to the engine mount structure.

These aspects and other embodiments may include one or more of the following features. The shaft may be rotationally mounted via a plurality of bearing assemblies. Each bearing assembly includes an inner race, an outer race, and a plurality of roller elements disposed between the inner race and the outer race. The inner race may be mounted on the shaft, and the conductive rod may physically contact the outer race. The first end of the conductive rod may comprise an abrasive material, and the first end may physically contact the shaft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A lightning protected gas turbine engine, comprising:
   an engine mount structure having at least one engine mounting pad thereon;
   an engine case coupled to the engine mount structure;
   a gas turbine engine disposed within the engine case and including at least a rotationally mounted shaft; and
   a conductive rod having a first end and a second end, the conductive rod extending through the engine case, and into the gas turbine engine, the first end of the conductive rod electrically coupled to the shaft, the second end of the conductive rod electrically coupled to the at least one engine mounting pad.

2. The lightning protected gas turbine engine of claim 1, wherein:
   the shaft is rotationally mounted via a plurality of bearing assemblies, each bearing assembly including an inner race, an outer race, and a plurality of roller elements disposed between the inner race and the outer race, the inner race mounted on the shaft; and
   the conductive rod physically contacts the outer race.

3. The lightning protected gas turbine engine of claim 1, wherein:
   the first end of the conductive rod comprises an abrasive material; and
   the first end physically contacts the shaft.

4. The lightning protected gas turbine engine of claim 3, wherein the abrasive material is selected from the group consisting of copper, silver, gold, aluminum, tin, bronze, and various alloys thereof.

5. The lightning protected gas turbine engine of claim 1, further comprising:
   an electrical conductor coupled to the at least one engine mounting pad and to the second end of the conductive rod to thereby electrically couple the conductive rod to the engine mount structure.

6. The lightning protected gas turbine engine of claim 1, further comprising:
   a plurality of electrical conductors, each electrical conductor coupled to the at least one engine mounting pad and to the second end of the conductive rod to thereby electrically couple the conductive rod to the engine mount structure.

7. The lightning protected gas turbine engine of claim 1, further comprising:
   a sleeve surrounding at least a portion of the conductive rod, the sleeve at least partially comprising an electrically conductive material.

8. The lightning protected gas turbine engine of claim 7, wherein:
   the conductive rod comprises copper; and
   the sleeve comprises stainless steel.

9. The lightning protected gas turbine engine of claim 1, wherein the gas turbine engine is a turboprop gas turbine propulsion engine.

10. A lightning protected gas turbine engine, comprising:
    an engine mount structure having at least one engine mounting pad thereon;
    an engine case coupled to the engine mount structure;
    a turboprop gas turbine propulsion engine disposed at least partially within the engine case and including at least a rotationally mounted shaft;
    a conductive rod having a first end and a second end, the conductive rod extending through the engine case, and into the gas turbine engine, the first end of the conductive rod electrically coupled to the shaft, the second end of the conductive rod electrically coupled to the at least one engine mounting pad; and
    a sleeve surrounding at least a portion of the conductive rod, the sleeve at least partially comprising an electrically conductive material.

11. The lightning protected gas turbine engine of claim 10, wherein:
    the shaft is rotationally mounted via a plurality of bearing assemblies, each bearing assembly including an inner race, an outer race, and a plurality of roller elements disposed between the inner race and the outer race, the inner race mounted on the shaft; and
    the conductive rod physically contacts the outer race.

12. The lightning protected gas turbine engine of claim 10, wherein:
    the first end of the conductive rod comprises an abrasive material; and
    the first end physically contacts the shaft.

13. The lightning protected gas turbine engine of claim 12, wherein the abrasive material is selected from the group consisting of copper, silver, gold, aluminum, tin, bronze, and various alloys thereof.

14. The lightning protected gas turbine engine of claim 10, further comprising:
    an electrical conductor coupled to the at least one engine mounting pad and to the second end of the conductive rod to thereby electrically couple the conductive rod to the engine mount structure.

15. The lightning protected gas turbine engine of claim 1, further comprising:
    a plurality of electrical conductors, each electrical conductor coupled to the at least one engine mounting pad and to the second end of the conductive rod to thereby electrically couple the conductive rod to the engine mount structure.

16. The lightning protected gas turbine engine of claim 10, wherein:
    the conductive rod comprises copper; and
    the sleeve comprises stainless steel.

17. A lightning protected gas turbine engine, comprising:
    an engine mount structure having at least one engine mounting pad thereon;
    an engine case coupled to the engine mount structure;
    a turboprop gas turbine propulsion engine disposed at least partially within the engine case and including at least a rotationally mounted shaft;
    a conductive rod having a first end and a second end, the conductive rod extending through the engine case, and into the gas turbine engine, the first end of the conductive rod electrically coupled to the shaft, the second end of the conductive rod electrically coupled to the at least one engine mounting pad;
    a sleeve surrounding at least a portion of the conductive rod, the sleeve at least partially comprising an electrically conductive material; and at least one electrical conductor coupled to the at least one engine mounting pad and to the second end of the conductive rod to thereby electrically couple the conductive rod to the engine mount structure.

18. The lightning protected gas turbine engine of claim 17, wherein:

the shaft is rotationally mounted via a plurality of bearing assemblies, each bearing assembly including an inner race, an outer race, and a plurality of roller elements disposed between the inner race and the outer race, the inner race mounted on the shaft; and the conductive rod physically contacts the outer race.

19. The lightning protected gas turbine engine of claim 17, wherein:

the first end of the conductive rod comprises an abrasive material; and the first end physically contacts the shaft.

20. The lightning protected gas turbine engine of claim 19, wherein the abrasive material is selected from the group consisting of copper, silver, gold, aluminum, tin, bronze, and various alloys thereof.

* * * * *